United States Patent [19]

Hertl et al.

[11] Patent Number: 4,576,687

[45] Date of Patent: Mar. 18, 1986

[54] HYDROGEN PEROXIDE PRODUCTION USING A NON-AQUEOUS SYSTEM

[75] Inventors: William Hertl, Corning; Howard H. Weetall, Big Flats, both of N.Y.

[73] Assignee: Corning Glass Works, Corning, N.Y.

[21] Appl. No.: 634,565

[22] Filed: Jul. 26, 1984

[51] Int. Cl.[4] ............................................. B01J 19/12
[52] U.S. Cl. ................................................ 204/157.5
[58] Field of Search ...................... 204/157.1 R, 158 R

[56] References Cited

U.S. PATENT DOCUMENTS 1,659,382  2/1928  Taylor .......................... 204/157.1 R

OTHER PUBLICATIONS

Wells, Transactions of the Faraday Society, 57, 1961, pp. 1703 et seq.

Primary Examiner—Howard S. Williams
Attorney, Agent, or Firm—Brian D. Voyce

[57] ABSTRACT

The present invention relates to hydrogen peroxide production. More particularly, a novel process is disclosed that uses electromagnetic radiation a quinone autooxidation in a non-aqueous environment, i.e. ethylene glycol.

4 Claims, 4 Drawing Figures

HYDROGEN PEROXIDE PRODUCTION USING A NON-AQUEOUS SYSTEM

TECHNICAL FIELD

The present invention relates to hydrogen peroxide production. More particularly, a novel process is disclosed that uses a quinone autooxidation in a non-aqueous environment, i.e. ethylene glycol.

BACKGROUND ART

Hydrogen peroxide has a variety of uses in industry and medicine. Its manufacture in the U.S., since 1957, has been based primarily on the autoxidation of an anthraquinone. The anthraquinone (Riedl-Pfleiderer) process has been first commercialized by I. G. Farbenindustrie in Germany during World War II. All subsequent processes have retained the basic features of this process.

Essentially, a 2-alkylanthraquinone dissolved in a suitable solvent system is reduced catalytically to a corresponding anthraquinol (anthrahydroquinone). The anthraquinol is separated from the metal hydrogenation catalyst and aerated with an $O_2$ containing air as to form the anthraquinone plus $H_3O_2$. The $H_2O_2$ is extracted with water, purified, and concentrated to the required degree. Yields are high but secondary reactions necessitate regeneration of the solutions and the metal catalyst on a regular basis.

Solvent systems for this process include 50:50 water and benzene, and a mixture of $C_7$–$C_9$ alcohols, originally used in the Riedl-Pfleiderer process. Recent systems contain trialkylphosphates tetralkylated-substituted ureas, dialkycarboxylic acid amines and dicyclohexanes among other organic compounds.

The oxidation of alcohols in the presence of a photo-excited quinone has been discussed in an article by C. F Wells, "Hydrogen Transfer to Quinones", Transactions of the Faraday Society, 57, 1961, pp 1703 et seq. In a cylindrical quartz cell, a solution of isopropyl alcohol and sodium anthraquinone-2-sulfonate is shaken in the presence of oxygen while being irradiated by 365 nanometer light. The alcohol is oxidized to acetone, and hydrogen peroxide is formed. The oxygen uptake and the peroxide product have been measured to determine the reaction sequence.

DISCLOSURE OF THE INVENTION

The present invention is a novel process for manufacturing hydrogen peroxide ($H_2O_2$). Although similar to the Riedl-Pfleiderer process in the use of a quinone compound, the present photo-oxidation process relies upon completely different reactants and steps to yield $H_2O_2$. Three steps are involved, none of which involves metal catalyst.

An effective amount of a photoexcitable quinone is mixed with ethylene glycol, substantially free from water. Oxygen is purged into the mixture while it is irradiated with light of a suitable wavelength, i.e., one which excites the quinone. The ethylene glycol is oxidized by the excited quinone into a decomposition product, such as an aldehyde, ketone, or acid, and hydrogen peroxide.

The overall molecular reactions taking place are indicated in the schematic given below. Step (0) is the photoexcitation of the sulfonated anthraquinone (A2SA). This photo-excited A2SA can accept electrons from the hydroxyl group of the ethylene glycol (step 1) to produce the hydroxy aldehyde. Further oxidation of the aldehyde group to a carboxyl group can be readily envisaged.

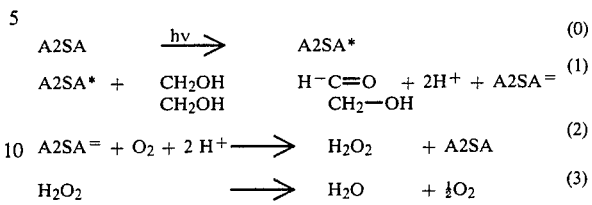

Hydrogen peroxide is separated from the mixture by conventional techniques, e.g. distillation.

MODES OF CARRYING OUT THE INVENTION

Initial experiments were performed using anthraquinone-2-sulfonic acid (A2SA) as the quinone, and ethylene glycol. However, other suitable quinone compounds are: anthraquinone (AQ), anthraquinone 1,5 disulfonic acid (A1DA), anthraquinone-2,6-disulfonic acid (A2DA), and benzoquinone.

In all cases examples herein, $H_2O_2$ production was determined non-enzymatically in a Yellow Springs Instruments (YSI*) Model 27 Industrial Analyzer. Using various membranes, the YSI is generally used to detect glucose, sucrose, and lactose in foods and other non-clinical materials. These membranes contain one or more immobilized enzymes, which convert the substance to be measured into $H_2O_2$. Hydrogen peroxide is then measured by an amperometric electrode which responds to $H_2O_2$ according to the following equation:

Current flow in the platinum anode circuit is linearly proportional to the local concentration of $H_2O_2$. The circuit is completed by a silver cathode:

Nonenzymatic "blank" membranes were used to measure $H_2O_2$ concentration directly. The analyzer was calibrated using a dilute solution of 30% $H_2O_2$ (1:1600 in distilled $H_2O$), and the carrier solvent was sodium phosphate buffer, pH 6.0.

$H_2O_2$ Synthesis

Hydrogen peroxide synthesis reactions were carried out in 500 ml, narrow-neck, glass vessels, which were illuminated with high intensity lights from slide projectors and filled with 100 ml solutions. The reaction mixtures were vigorously stirred to ensure oxygenation. Alternatively, the mixtures were stirred and purged with $O_2$ by placing a small $O_2$ line directly into the swirling solution.

The following conditions were used for an alkaline pH (12) run: 100 mls ethylene glycol (pH 12), 5% glucose, 100 mM A2SA, with $O_2$ purge.

EFFECT OF GLUCOSE

Figure 1:
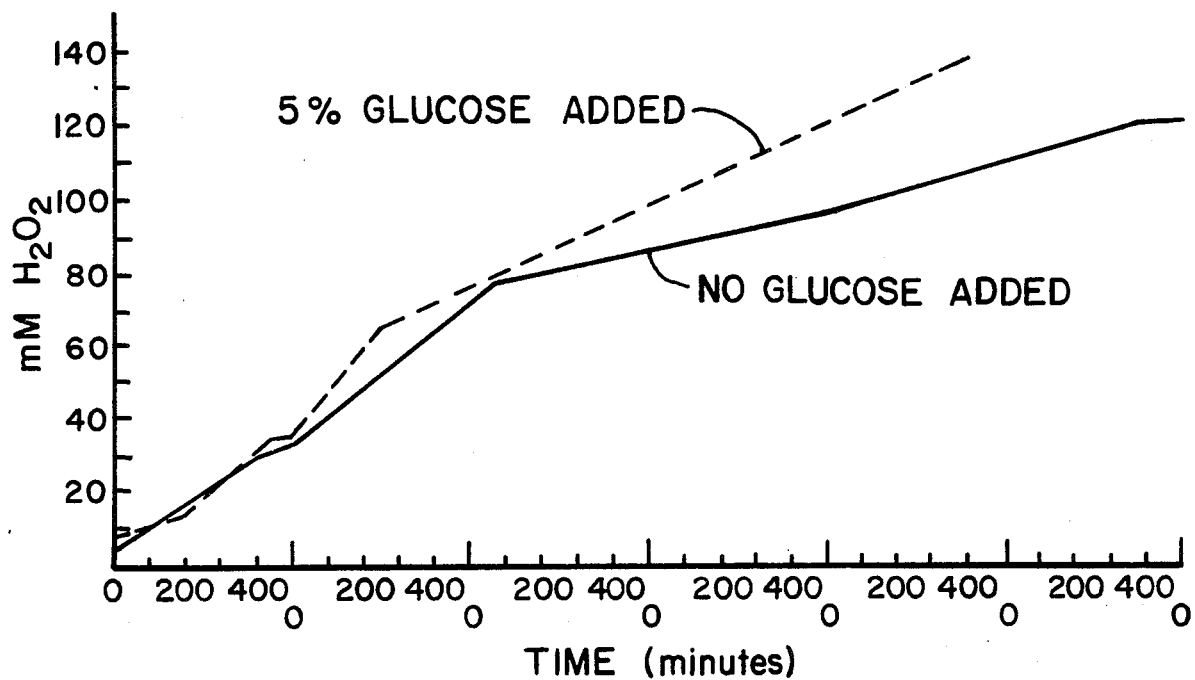
FIG. 1 is a graph showing the effect of glucose on $H_2O_2$ formation.

To determine the effect of glucose on $H_2O_2$ production, comparison runs were made. The conditions were pH 7 and 10 mM A2SA. FIG. 1 shows that the presence or absence of glucose had little effect on $H_2O_2$ formation.

EFFECT OF QUINONE CONCENTRATION

To determine the effect of varying the quinone concentration, a series of runs were made at pH 7 with 5, 10, 50, and 100 mM A2SA.

Figure 2:
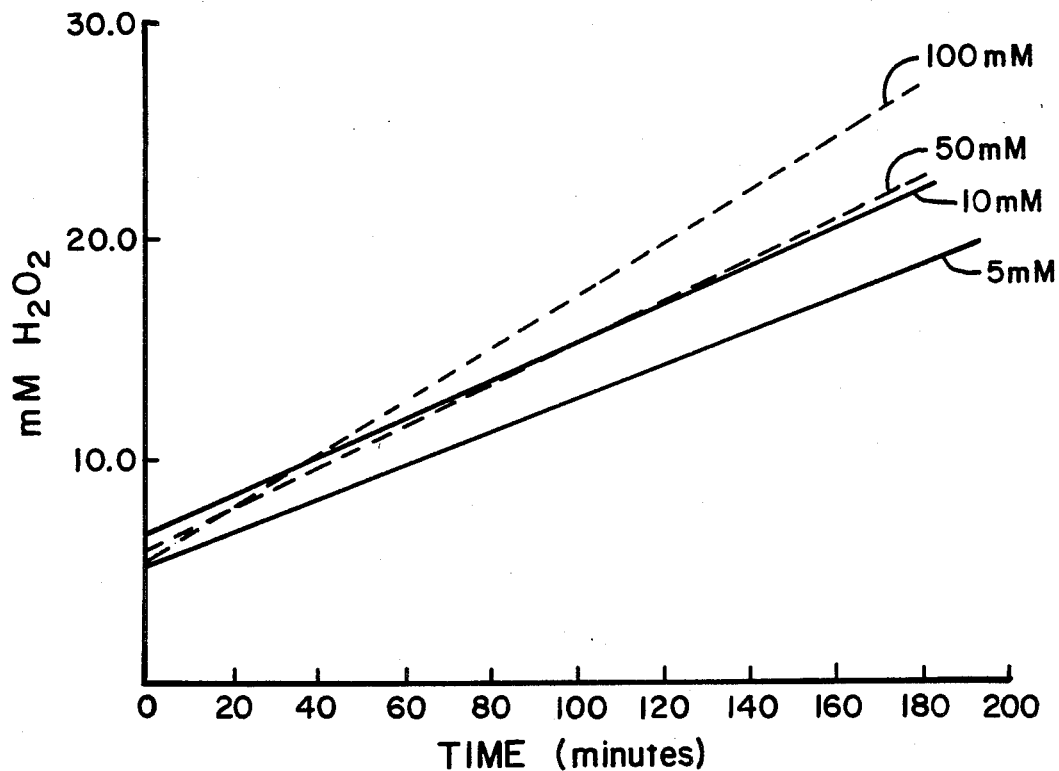
FIG. 2 is a graph showing the effect of A2SA concentration on $H_2O_2$ formation.

FIG. 2 reveals that in this range of A2SA concentrations, there is only a slight dependence of the $H_2O_2$ formation rate on A2SA concentration. A ten-fold concentration increase in A2SA gives a two-fold increase in final ($H_2O_2$). This is similar to the effect observed in aqueous systems. The rates of formation with ethylene glycol are not substantially different from those obtained with glucose in aqueous systems, but the limiting $H_2O_2$ concentrations attained are about 30 times greater. In the ethylene glycol experiments an $H_2O_2$ concentration of 168 mM (0.57% w/v) was attained.

$H_2O_2$ DEGRADATION IN THE NON-AQUEOUS REACTANT

Hydrogen peroxide degradation studies were carried out in the same type of glass vessels, starting with a 5.5 mM solution of $H_2O_2$. The rate of degradation was tested at pH 12 for ethylene glycol and pH 13 for $H_2O$. The vessels were not illuminated during the degradation studies because they did not contain any A2SA.

Figure 3:
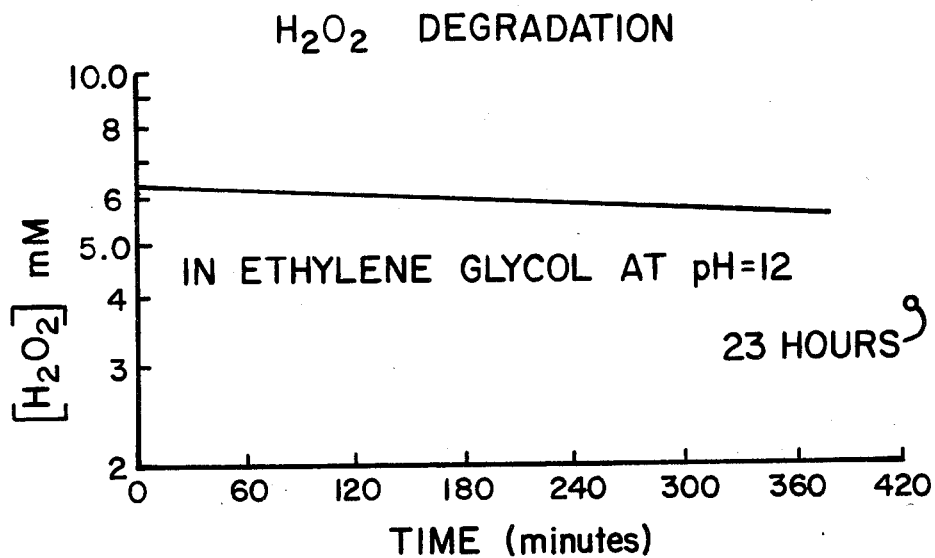
FIG. 3 is a graph showing $H_2O_2$ degradation in ethylene glycol at pH 12.
Figure 4:
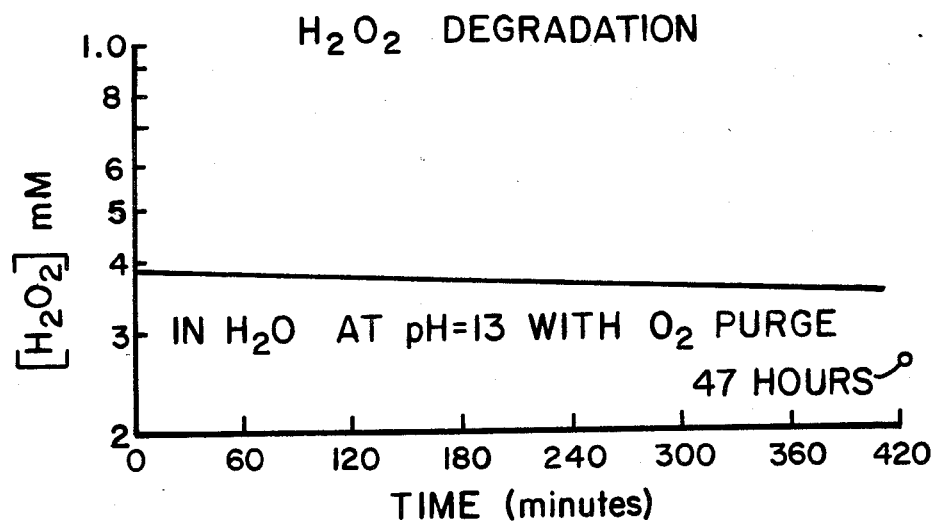
FIG. 4 is a graph showing $H_2O_2$ degradation in water at pH 13.

FIGS. 3 and 4 disclose that the half life of $H_2O_2$ in ethylene glycol of 16 hours was markedly better than the 3.5 hours recorded with an aqueous system.

$H_2O_2$ LIMITING CONCENTRATIONS

For a given set of conditions a limiting concentration of $H_2O_2$ was determined by experimental runs. This limiting concentration was due probably to either (a) the establishment of an equilibrium $H_2O_2$ concentration for a reversible reaction, or (b) inhibition of the reaction by the product $H_2O_2$. Either of these causes was consistent with the experimental observations in which the same limiting $H_2O_2$ concentration was attained whether one started with no initial $H_2O_2$ or with some added $H_2O_2$. Both causes were consistent also with the experimental results in which $H_2O_2$ decomposition takes place, i.e. after reaching the limiting concentration and then allowing some of the $H_2O_2$ to decompose, further illumination resulted in producing more $H_2O_2$ until the same limiting concentration was attained.

After 7.5 hrs. illumination, $H_2O_2$ attained a limiting concentration of 40 mM (0.13% w/v), which is substantially higher than the (6 mM) value attained by an equivalent 5% glucose in water system. On standing for 18 hours, the concentration dropped by about one half, and on reilluminating the $H_2O_2$ concentration again rose to its equilibrium value of about 40 mM.

The reactions were then carried out at pH 7 and a much higher limiting $H_2O_2$ concentration of 138 mM was attained. This behavior is quite different from the 6 mM $H_2O_2$ concentration obtained from a 5% glucose in aqueous solution run that was also made.

The data plotted in FIG. 1 (with ethylene glycol at pH 7) was obtained by alternate illumination and dark periods. As can be seen, no reaction took place during the dark periods, i.e. neither $H_2O_2$ formation nor $H_2O_2$ decomposition. This suggested that the reactions are irreversible, and hence that the limiting concentration attained was due to inhibition rather than due to the attainment of an equilibrium concentration.

Having described the invention with particular reference to preferred embodiments, it will be obvious to those skilled in the art to which the invention pertains, that, after understanding the invention, various changes and modifications may be made without departing from the spirit and scope of the invention as defined by the appended claims.

We claim:

1. A process for making hydrogen peroxide comprising:
   (a) mixing a catalystically effective amount of a photo-excitable quinone compound with ethylene glycol, substantially free from water;
   (b) purging the quinone compound and ethylene glycol mixture with oxygen; and
   (c) irradiating the mixture with electromagnetic radiation which excites the quinone compound, thereby oxidizing the ethylene glycol and forming hydrogen peroxide.

2. The process of claim 1 wherein a reducing sugar is added.

3. The process of claim 1 wherein the photo-excitable quinone compound is selected from sulfoanthraquinones, anthraquinone, and benzoquinone.

4. The process of claim 3 wherein the photo-excitable quinone compound is anthraquinone-2-sulfonic acid or anthraquinone-2,6-disulfonic acid.

* * * * *